United States Patent
Voskerician et al.

(10) Patent No.: US 11,375,380 B1
(45) Date of Patent: Jun. 28, 2022

(54) METHOD AND SYSTEM OF A PUBLIC ENGAGEMENT COMPUTING PLATFORM

(71) Applicants: Mircea Voskerician, Mountain View, CA (US); Raj Abhyanker, Cupertino, CA (US)

(72) Inventors: Mircea Voskerician, Mountain View, CA (US); Raj Abhyanker, Cupertino, CA (US)

(73) Assignee: NEARCAST INC., Mountain View, CA (US)

( * ) Notice: Subject to any disclaimer, the term of this patent is extended or adjusted under 35 U.S.C. 154(b) by 0 days.

(21) Appl. No.: 17/223,026

(22) Filed: Apr. 6, 2021

Related U.S. Application Data

(60) Provisional application No. 63/165,706, filed on Mar. 24, 2021.

(51) Int. Cl.
  *H04W 12/63* (2021.01)
  *H04W 4/029* (2018.01)
  (Continued)

(52) U.S. Cl.
  CPC ........... *H04W 12/63* (2021.01); *H04W 4/021* (2013.01); *H04W 4/023* (2013.01); *H04W 4/029* (2018.02); *H04W 12/66* (2021.01)

(58) Field of Classification Search
  CPC ..... H04W 12/63; H04W 4/029; H04W 12/66; H04W 4/021; H04W 4/023
  See application file for complete search history.

(56) References Cited

U.S. PATENT DOCUMENTS

| 6,594,652 B1 | 7/2003 | Sunaga et al. |
| 6,691,153 B1 | 2/2004 | Hanson et al. |

(Continued)

FOREIGN PATENT DOCUMENTS

| CN | 106027366 A | 10/2016 |
| CN | 112435136 A | 3/2021 |

(Continued)

OTHER PUBLICATIONS

"Hiago Website", by Hiago Found Online on [May 28, 2021] https://hiago.com/.

(Continued)

*Primary Examiner* — Curtis B Odom
(74) *Attorney, Agent, or Firm* — Legalforce RAPC Worldwide

(57) ABSTRACT

A method includes executing instructions associated with a public engagement computing platform on a server, publishing an agenda of a live event on the public engagement computing platform, and determining a set of trusted locations corresponding to a set of users of a number of client devices accessing the agenda. The method also includes analyzing communication pertinent to the agenda from at least a subset of the set of users, scoring at least the subset of the set of users based on the analyzed communication in accordance with the determined set of trusted locations and a relevance of the analyzed communication with respect to the agenda, and, in accordance with the scoring, determining a placement of the analyzed communication in an order of publicly viewable analyzed communication that is part of all analyzed communication pertinent to the agenda.

20 Claims, 10 Drawing Sheets

(51) Int. Cl.
*H04W 12/60* (2021.01)
*H04W 4/02* (2018.01)
*H04W 4/021* (2018.01)

(56) References Cited

U.S. PATENT DOCUMENTS

| | | | |
|---|---|---|---|
| 7,188,079 | B2 | 3/2007 | Arnett et al. |
| 7,548,930 | B2 | 6/2009 | Kobza et al. |
| 7,600,017 | B2 | 10/2009 | Holtzman et al. |
| 7,904,515 | B2 | 3/2011 | Ambati et al. |
| 8,064,590 | B2 | 11/2011 | Abhyanker |
| 8,135,693 | B2 | 3/2012 | Brazier et al. |
| 8,160,970 | B2 | 4/2012 | Allsop |
| 8,161,110 | B2 | 4/2012 | Verhaeghe et al. |
| 8,204,776 | B2 | 6/2012 | Abhyanker |
| 8,412,565 | B2 | 4/2013 | Müller |
| 8,732,605 | B1 | 5/2014 | Falaki |
| 8,793,324 | B1 | 7/2014 | Schabes et al. |
| 8,904,295 | B2 | 12/2014 | Whalin et al. |
| 9,002,754 | B2 | 4/2015 | Abhyanker |
| 9,064,288 | B2 | 6/2015 | Abhyanker |
| 9,134,875 | B2 | 9/2015 | Falaki et al. |
| 9,160,692 | B2 | 10/2015 | Socolof |
| 9,251,113 | B1 | 2/2016 | McIlroy |
| 9,268,398 | B2 | 2/2016 | Tipirneni et al. |
| 9,514,435 | B2 | 12/2016 | Nguyen |
| 9,584,526 | B2 | 2/2017 | Williams et al. |
| 9,654,425 | B2 | 5/2017 | Heiferman et al. |
| 9,940,008 | B2 | 4/2018 | Tolia et al. |
| 10,235,025 | B2 | 3/2019 | Falaki et al. |
| 10,269,457 | B2 | 4/2019 | Palter |
| 10,298,410 | B2 | 5/2019 | Whalin et al. |
| 10,298,535 | B2 | 5/2019 | Dange |
| 10,534,521 | B2 | 1/2020 | Tolia et al. |
| 10,693,669 | B2 | 6/2020 | Dave et al. |
| 10,873,557 | B2 | 12/2020 | Goenka et al. |
| 2008/0040137 | A1 | 2/2008 | Lee et al. |
| 2008/0184122 | A1 | 7/2008 | Grant et al. |
| 2009/0063991 | A1 | 3/2009 | Baron et al. |
| 2009/0222382 | A1 | 9/2009 | Kobza et al. |
| 2009/0228478 | A1 | 9/2009 | Steichen |
| 2011/0219071 | A1 | 9/2011 | Vogel et al. |
| 2012/0042266 | A1 | 2/2012 | Sotropa |
| 2013/0042186 | A1 | 2/2013 | Tranchina |
| 2014/0073362 | A1* | 3/2014 | Kawata .......... G06Q 50/01 455/456.3 |
| 2014/0136328 | A1 | 5/2014 | Abhyanker |
| 2014/0143004 | A1 | 5/2014 | Abhyanker |
| 2014/0165091 | A1 | 6/2014 | Abhyanker |
| 2014/0200963 | A1 | 7/2014 | Abhyanker |
| 2014/0358632 | A1 | 12/2014 | Graff et al. |
| 2015/0033153 | A1 | 1/2015 | Knysz et al. |
| 2015/0039691 | A1 | 2/2015 | Sharma et al. |
| 2015/0089399 | A1 | 3/2015 | Megill et al. |
| 2015/0089409 | A1 | 3/2015 | Asseily et al. |
| 2016/0078458 | A1 | 3/2016 | Gold et al. |
| 2016/0261647 | A1 | 9/2016 | Yerli |
| 2016/0358269 | A1 | 12/2016 | Talanov |
| 2017/0064033 | A1 | 3/2017 | Stackel et al. |
| 2017/0270547 | A1 | 9/2017 | Poltz |
| 2018/0101760 | A1 | 4/2018 | Nelson et al. |
| 2018/0114237 | A1 | 4/2018 | Kirk et al. |
| 2018/0294986 | A1 | 10/2018 | Vidro et al. |
| 2019/0058682 | A1 | 2/2019 | MacAskill et al. |
| 2019/0066230 | A1 | 2/2019 | Dange |
| 2019/0205000 | A1 | 7/2019 | Raghavendran |
| 2019/0281006 | A1 | 9/2019 | Dange |

FOREIGN PATENT DOCUMENTS

| | | |
|---|---|---|
| KR | 20030034062 A | 5/2003 |
| KR | 100528182 B1 | 11/2005 |
| KR | 101238810 B1 | 3/2013 |
| KR | 101539076 B1 | 7/2015 |
| KR | 101573327 B1 | 12/2015 |
| WO | 2011149563 A1 | 12/2011 |
| WO | 2014018065 A1 | 1/2014 |
| WO | 2020113344 A1 | 6/2020 |

OTHER PUBLICATIONS

"Hiago Website", by Hiago Found Online on [May 28, 2021] https://hiago.com/agencies/.

"Hiago Website", by Hiago Found Online on [May 28, 2021] https://hiago.com/neighbors/.

"Hiago Website", by Hiago Found Online on [May 28, 2021] https://hiago.app/en/organizations/menlo-park.

"Town hall meeting" by Wikipedia, Found Online on [May 28, 2021] https://en.wikipedia.org/wiki/Town_hall_meeting.

"Public Participation Guide: Public Meetings" by EPA, Found Online on [May 28, 2021] https://www.epa.gov/international-cooperation/public-participation-guide-public-meetings.

"Online Public Participation Platforms and Applications" by Della G. Rucker, Published Online on [Mar. 26, 2014] https://comdev.osu.edu/sites/comdev/files/imce/Online%20Public%20Participation%20Platforms%20and%20Applications%20-%20white%20paper.pdf.

"Citizen Participation and the Rise of Digital Media Platforms in Smart Governance and Smart Cities" by Olga Gil, Published at International Journal of E-Planning Research on Jan.-Mar. 2019 https://repositorio.uam.es/bitstream/handle/10486/691570/citizen_gil_ijeplre_2019.pdf?sequence=1.

"Next generation engagement platform, and how they are useful right now (Part 1)" by Matt Stempeck, Published Online on [May 12, 2020] https://civichall.org/civicist/next-generation-engagement-platforms-and-how-are-they-useful-right-now-part-1/.

"Why Choose Online Community Engagement Platforms & Software" by OpenGOv, Found Online on [May 28, 2021] https://opengov.com/faq/online-civic-engagement-platform-benefits.

"Designing an Online Civic Engagement Platform:Balancing "More" vs. "Better" Participation in Complex Public Policymaking" by Cynthia R. Farina, Published at International Journal of E-Politics on Jan.-Mar. 2014 https://core.ac.uk/download/pdf/216740771.pdf.

* cited by examiner

DISPLAY DEVICE 224 / PUBLIC ENGAGEMENT COMPUTING PLATFORM ENGINE 120

AGENDA 204

WE SEEK TO ADDRESS WATER CONTAMINATION IN LAKE XANTHIPPE.
THE WATER IS THE ONLY SOURCE OF THE XYZ FISH. DESTRUCTION OF ITS HABITAT AND POLLUTION OF THE SOURCE OF DRINKING WATER SUPPLY TO OUR TOWN MUST BE ADDRESSED. WE INVITE SUGGESTIONS TOWARD THE SAME.

COMMENTS (ANALYZED USER COMMUNICATION $510_{1-M}/512_{1-P}$ )

ORDER 602

| | |
|---|---|
| 1 | USER $150_4$: WE SHOULD TAKE OUT THE POLLUTANTS AS PRECIPITATES |
| 2 | USER $218_{16}$: THE COST OF CLEANING THE WATER OUTWEIGHTS BENEFITS |
| 3 | • |
| 4 | • |
| 5 | • |

FIG. 6

METHOD AND SYSTEM OF A PUBLIC ENGAGEMENT COMPUTING PLATFORM

CLAIM OF PRIORITY

This application is a U.S. Utility Conversion Patent Application of U.S. Provisional Patent Application No. 63/165,706 titled "CONSTRAINED GEOGRAPHIC AUDIO-VISUAL LIVE-STREAMING AND IMPROMPTU AND AD HOC GROUP AUDIO IN A GEO-SPATIALLY CONSTRAINED NETWORK OF VERIFIED RESIDENTS" filed on Mar. 24, 2021. The content of the aforementioned application is incorporated by reference in entirety thereof.

FIELD OF TECHNOLOGY

This disclosure relates generally to computing platforms and, more particularly, to a method, a server and/or a system of a public engagement computing platform.

BACKGROUND

A governmental entity may struggle to involve more people in an endeavor thereof to discuss, adapt and course-correct policy making. Other entities such as cities, schools, and other agencies (e.g., water boards, county boards, commissions) may have trouble reaching beyond the usual groups of active residents. Public servants may be overwhelmed with an increasing burden of paperwork, outreach activities and recordkeeping.

Communication may offer a lot of challenges due to departments and users being spread out across various fragmented tools, leading to disengagement of the users with respect to meaningful communication. Even disengaged users (e.g., residents) may have plenty of ideas for improving governance, but they feel discouraged from bringing concerns thereof forward. Further, traditional communication tools may need to be updated to accommodate language barriers and accessibility issues.

SUMMARY

Disclosed are a method, a server and/or a system of a public engagement computing platform.

In one aspect, a method includes executing, through a server including a processor communicatively coupled to a memory, instructions associated with a public engagement computing platform, and, in accordance with the execution of the instructions associated with the public engagement computing platform, publishing an agenda of a live event on the public engagement computing platform accessible through a number of client devices communicatively coupled to the server through a computer network, and determining a set of trusted locations corresponding to a set of users of the number of client devices accessing the agenda of the live event based on: communicating, for a threshold number of instances, with each of the number of client devices for a Global Positioning System (GPS) location thereof during times of expected presence of a corresponding user of the set of users at a place of residence thereof within a predetermined geospatial boundary, and determining, based on the communication with the each of the number of client devices for the GPS location thereof, a confidence score for the corresponding user of the set of users indicating a likelihood of the place of residence of the corresponding user being a trusted location within the predetermined geospatial boundary.

The method also includes, in accordance with the execution of the instructions associated with the public engagement computing platform, analyzing communication pertinent to the agenda of the live event from at least a subset of the set of users originating from at least a subset of the number of client devices, scoring at least the subset of the set of users based on the analyzed communication in accordance with the determined set of trusted locations and a relevance of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary, and, in accordance with the scoring, determining a placement of the analyzed communication in an order of publicly viewable analyzed communication that is part of all analyzed communication pertinent to the agenda.

In another aspect, a system includes a number of client devices, and a server executing instructions associated with a public engagement computing platform. The server is communicatively coupled to the number of client devices through a computer network. In accordance with the execution of the instructions associated with the public engagement computing platform, the server publishes an agenda of a live event on the public engagement computing platform accessible through the number of client devices, and determines a set of trusted locations corresponding to a set of users of the number of client devices accessing the agenda of the live event based on: communicating, for a threshold number of instances, with each of the number of client devices for a GPS location thereof during times of expected presence of a corresponding user of the set of users at a place of residence thereof within a predetermined geospatial boundary, and determining, based on the communication with the each of the number of client devices for the GPS location thereof, a confidence score for the corresponding user of the set of users indicating a likelihood of the place of residence of the corresponding user being a trusted location within the predetermined geospatial boundary.

In accordance with the execution of the instructions associated with the public engagement computing platform, the server also analyzes communication pertinent to the agenda of the live event from at least a subset of the set of users originating from at least a subset of the number of client devices, scores at least the subset of the set of users based on the analyzed communication in accordance with the determined set of trusted locations and a relevance of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary, and, in accordance with the scoring, determines a placement of the analyzed communication in an order of publicly viewable analyzed communication that is part of all analyzed communication pertinent to the agenda.

In yet another aspect, a server includes a memory, and a processor communicatively coupled to the memory. The processor executes instructions associated with a public engagement computing platform to publish an agenda of a live event on the public engagement computing platform accessible through a number of client devices communicatively coupled to the server through a computer network, and determine a set of trusted locations corresponding to a set of users of the number of client devices accessing the agenda of the live event based on: communicating, for a threshold number of instances, with each of the number of client devices for a GPS location thereof during times of expected presence of a corresponding user of the set of users at a place of residence thereof within a predetermined geospatial boundary, and determining, based on the communication with the each of the number of client devices for the GPS location thereof, a confidence score for the corresponding user of the set of users indicating a likelihood of the place of residence of the corresponding user being a trusted location within the predetermined geospatial boundary.

The processor also executes instructions associated with a public engagement computing platform to analyze communication pertinent to the agenda of the live event from at least a subset of the set of users originating from at least a subset of the number of client devices, score at least the subset of the set of users based on the analyzed communication in accordance with the determined set of trusted locations and a relevance of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary, and, in accordance with the scoring, determine a placement of the analyzed communication in an order of publicly viewable analyzed communication that is part of all analyzed communication pertinent to the agenda.

The methods and systems disclosed herein may be implemented in any means for achieving various aspects, and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 6 is a schematic view of publishing of real-time updates of the event with respect to the agenda on a display device/a public engagement computing platform engine of the public engagement computing platform of FIGS. 1 and 2, according to one or more embodiments.

Other features of the present embodiments will be apparent from the accompanying drawings and from the detailed description that follows.

DETAILED DESCRIPTION

Example embodiments, as described below, may be used to provide a method, a server and/or a system of a public engagement computing platform. Although the present embodiments have been described with reference to specific example embodiments, it will be evident that various modifications and changes may be made to these embodiments without departing from the broader spirit and scope of the various embodiments.

Figure 1:
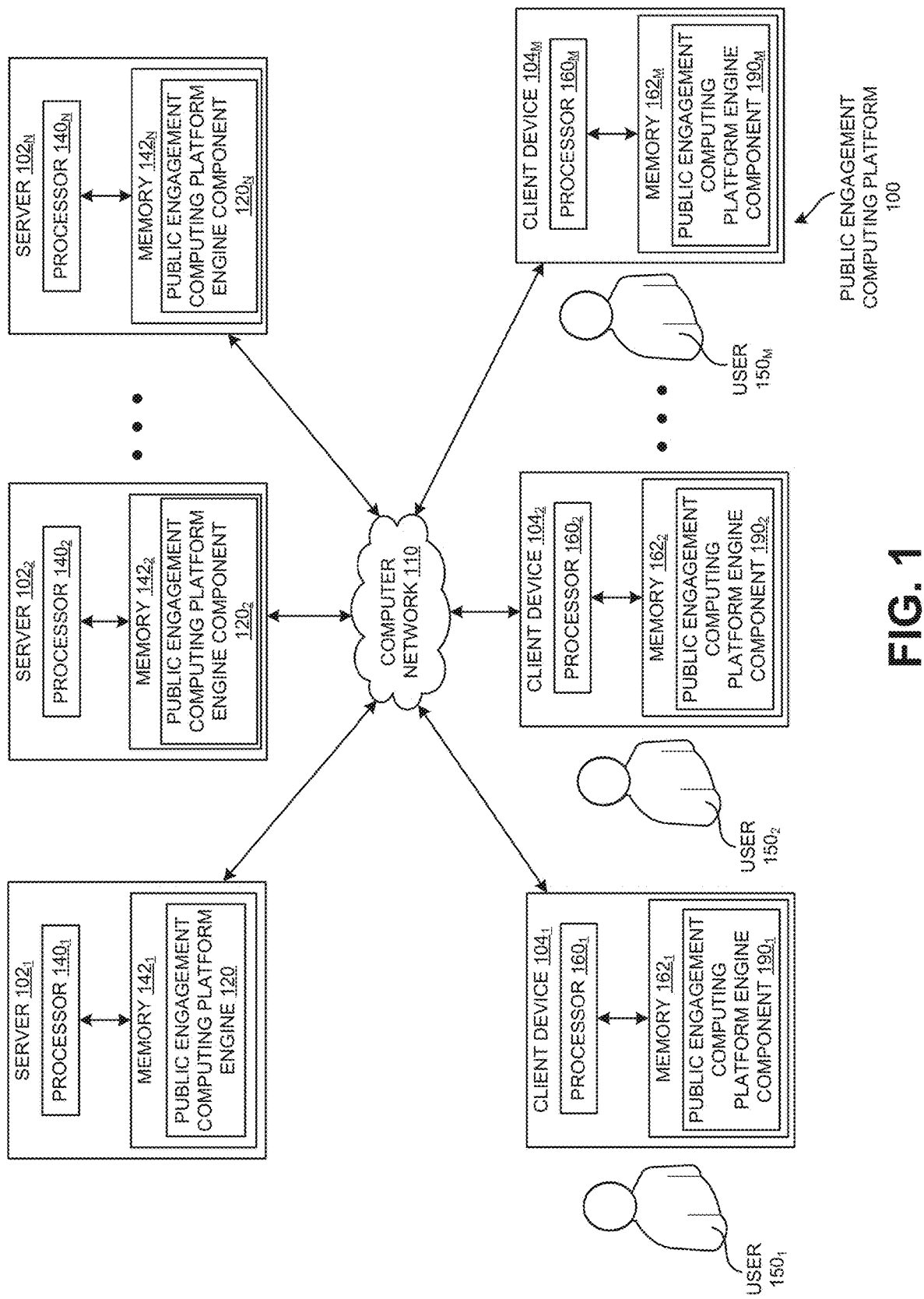
FIG. 1 is a schematic view of a public engagement computing platform, according to one or more embodiments.

FIG. 1 shows a public engagement computing platform 100, according to one or more embodiments. In one or more embodiments, public engagement computing platform 100 may be associated with local governments attempting to increase engagement with people. For example, public engagement computing platform 100 may be associated with a city government attempting to engage with residents through events such as meetings. In another example, public engagement computing platform 100 may be associated with the management of a school (e.g., a public school, a private school) attempting an outreach beyond the usual groups of active residents of a geographical area in which the school is also located.

Departments of an entity and users spread far and wide may attempt to communicate, with tools of said communication being fragmented. This fragmentation and difficulty in communication may lead to disengaged and frustrated users who shy away from contributing feedback and insights to governance thereof. In one or more embodiments, public engagement computing platform 100 may solve the aforementioned issues, thereby leading to increased communitarian engagement and outreach on part of an entity.

In one or more embodiments, public engagement computing platform 100 may include a network of one or more servers and data processing devices including display devices, client devices and kiosks executing processing engines or components of processing engines thereon. FIG. 1 shows a server $102_1$ of a number of servers $102_{1-N}$ executing a public engagement computing platform engine 120 thereon, according to one or more embodiments. It should be noted that public engagement computing platform engine 120 may execute on one or more servers $102_{1-N}$ distributed across public engagement computing platform 100. In one or more embodiments, servers $102_{1-N}$ may be communicatively coupled to one another through a computer network 110 (e.g., a Local Area Network (LAN), a Wide Area Network (WAN), a short-range network, a mobile network). In some other embodiments, at least a few servers $102_{1-N}$ may be communicatively coupled to one another through wired means.

In one or more embodiments, as shown in FIG. 1, each server $102_{2-N}$ other than server $102_1$ may execute a public engagement computing platform component $120_{2-N}$ through which functionalities associated with public engagement computing platform 100 may be performed. In one or more embodiments, public engagement computing platform 100 may also include a number of client devices $104_{1-M}$ (e.g., laptop computers, desktop computers, mobile devices such as mobile phones, smart devices) communicatively coupled to one another and to servers $102_{1-N}$ through computer network 110. In one or more embodiments, each client device $104_{1-M}$ may be associated with a user $150_{1-M}$ having a specific geographical location associated therewith. In one or more embodiments, as shown in FIG. 1, each client device $104_{1-M}$ may execute a public engagement computing platform component $190_{1-M}$ (e.g., analogous to public engagement computing platform component $120_{2-N}$) thereon.

FIG. 1 shows server $102_{1-N}$ as including as processor $140_{1-N}$ communicatively to a memory $142_{1-N}$ (e.g., a volatile and/or a non-volatile memory), according to one or more embodiments; the aforementioned public engagement computing platform engine 120 is shown as stored in memory $142_1$ and public engagement computing platform engine components $120_{2-N}$ are shown as stored in memory $142_{2-N}$. FIG. 1 also shows each client device $104_{1-M}$ as including a processor $160_{1-M}$ communicatively coupled to memory $162_{1-M}$, with each public engagement computing platform engine component $190_{1-M}$ residing in a corresponding memory $162_{1-M}$. It should be noted that instructions associated with public engagement computing platform engine 120/public engagement computing platform engine components $120_{2-N}/190_{1-M}$ may be executable through processor $140_1$/processor $140_{2-N}$/processor $160_{1-M}$.

Figure 2:
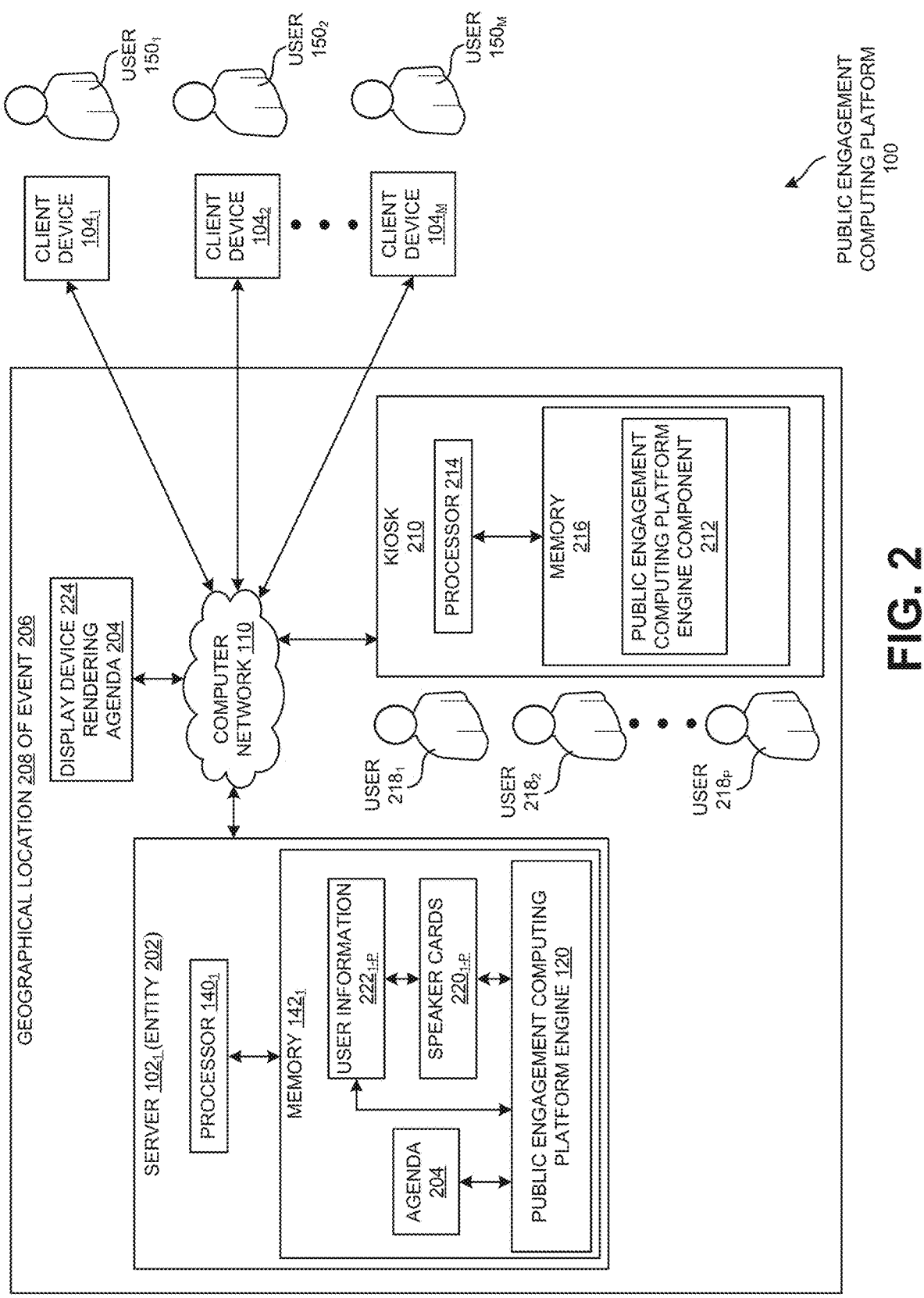
FIG. 2 is a contextual implementation of the public engagement computing platform of FIG. 1, according to one or more embodiments.

FIG. 2 shows a contextual implementation of public engagement computing platform 100, according to one or more embodiments. Here, only server $102_1$ is shown for the sake of illustrative convenience. Obviously, more than one server $102_{1-N}$ may perform the functionalities discussed herein. In an example scenario, server $102_1$ may be associated with a city council (e.g., shown as an example of an entity 202 associated with server $102_1$) in charge of legislation and governance with respect to a geographical region covering a city. The city council may attempt an outreach event where feedback of residents of the city may be sought in order to understand effectiveness of policies thereof. With regard to this, entity 202 (e.g., the city council) may publish an agenda 204 of an event 206 (e.g., the outreach event) accessible through public engagement computing platform 100.

In one or more embodiments, server $102_1$ of entity 202 may publish agenda 204 of event 206 based on execution of public engagement computing platform engine 120 thereon. FIG. 2 shows agenda 204 as part of memory $142_1$ of server $102_1$. In one or more embodiments, agenda 204 may be accessible through client devices $104_{1-M}$ communicatively coupled to server $102_1$ based on execution of public engagement computing platform engine component $190_{1-M}$ thereon. In some embodiments, client devices $104_{1-M}$ may be able to download (e.g., in a restricted/unrestricted manner) agenda 204 thereto from server $102_1$.

Further, entity 202 may conduct event 206 at a geographical location 208 (e.g., at a location within the city, outside the city). For example, the meeting may be conducted at a conference room of a hotel. At the lobby area of the hotel, a kiosk 210 may be kept to enable people attending event 206 to register therefor. Kiosk 210, as discussed herein, may be a freestanding, bidirectional communication device with a touch-screen display that enables a user to generate a "speaker card" that can either be printed or digitally delivered to a mobile device. When entity 202 is a city government and event 206 occurs in a public room of the city government, kiosk 210 may be placed in the chambers thereof. This may enable members of the public to provide inputs thereof through the kiosk 210 based on kiosk 210 executing another public engagement computing platform engine component 212 (analogous to public engagement computing platform engine components $120_{2-N}/190_{1-M}$) through a processor 214 thereof communicatively coupled to a memory 216.

FIG. 2 shows users $218_{1-P}$ interacting with kiosk 210; kiosk 210 may be communicatively coupled to server $102_1$ (e.g., through computer network 110). FIG. 2 also shows speaker cards $220_{1-P}$ associated with the aforementioned users $218_{1-P}$; speaker cards $220_{1-P}$ may be assumed to be in digital formats stored in memory $142_1$. In some implementations, users $218_{1-P}$ may be able to provide information associated therewith through speaker cards $220_{1-P}$. The aforementioned information provided may include, but are not limited to, addresses of residence, mobile phone number, feedback related to agenda 204 and suggestions pertaining to agenda 204. FIG. 2 shows user information $222_{1-P}$ as being associated with speaker cards $220_{1-P}$ in memory $142_1$. It should be noted that other users may provide information through other forms of communication (e.g., e-mails, written forms, oral forms at kiosk 210) and that the aforementioned other forms may be subsumed by user information $222_{1-P}$.

At geographical location 208 (e.g., conference room of the hotel) of event 206, a display device 224 may be placed to enable rendering of agenda 204 thereon; display device 224 may be communicatively coupled to server $102_1$ (e.g., through computer network 110). The rendering of agenda 204 on display device 224 may enable public viewing (e.g., by users $218_{1-P}$) thereof. In one or more embodiments, as agenda 204 may also be available through public engagement computing platform engine 120 to be accessed by users $150_{1-M}$ through client devices $104_{1-M}$ thereof, access of agenda 204 through client devices $104_{1-M}$ may be monitored through server $102_1$.

In one or more embodiments, agenda 204 may be posted (e.g., a few days) ahead of event 206. Thus, in one or more embodiments, server $102_1$ may monitor activity with regard to access of agenda 204 through client devices $104_{1-M}$. In one or more embodiments, access of agenda 204 may further involve registration for event 206 and/or input of information from a number of users $150_{1-M}$ through client devices $104_{1-M}$ thereof. For example, as part of the registration, the number of users $150_{1-M}$ may provide mobile phone numbers thereof. In one or more embodiments, server $102_1$ and/or one or more server(s) $102_{2-N}$ may periodically communicate with mobile phones of users $150_{1-M}$ based on execution on public engagement computing platform engine components $190_{1-M}$ thereon. In other words, client devices $104_{1-M}$ may be mobile phones.

Figure 3:
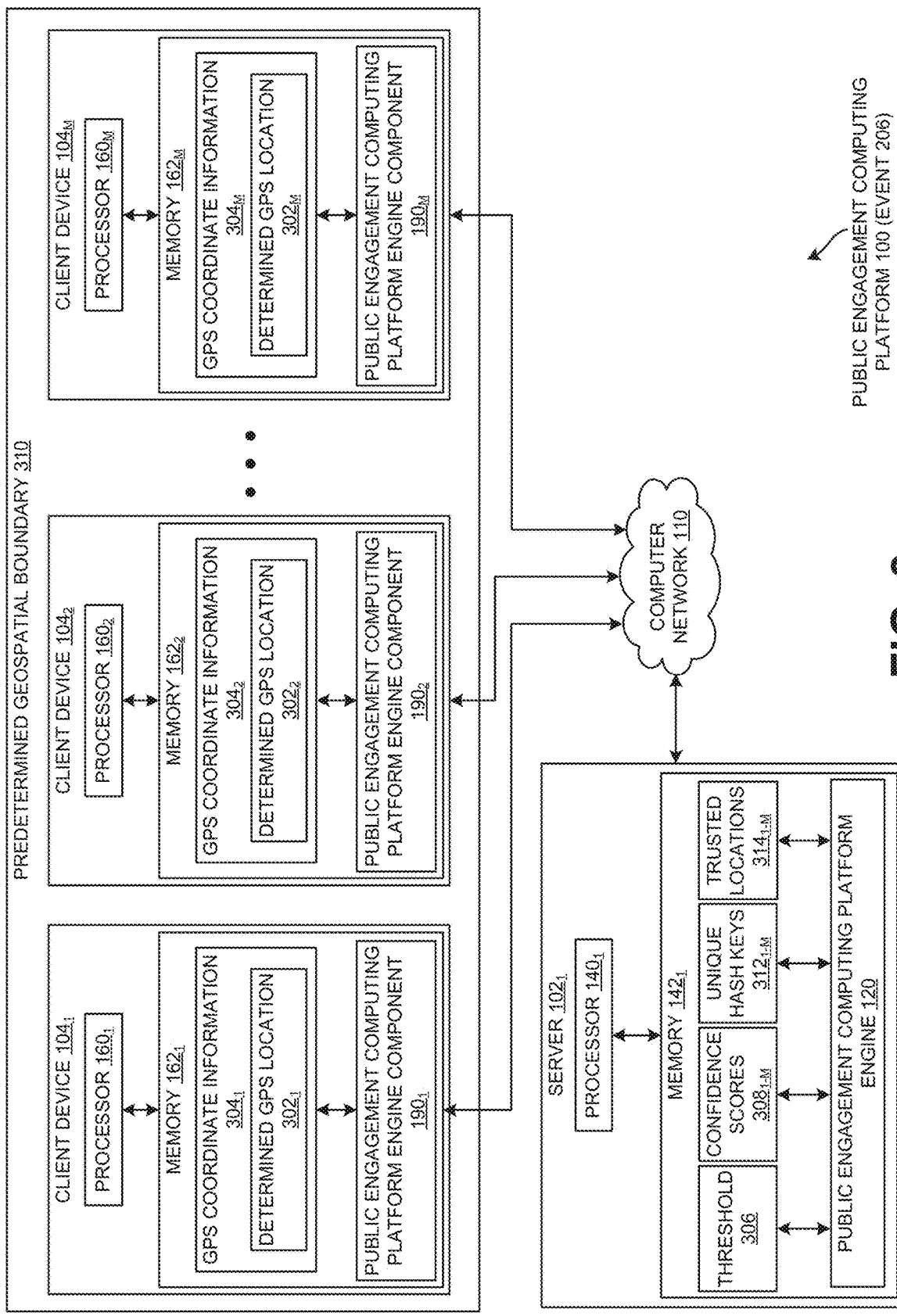
FIG. 3 is a schematic view of determining trusted locations of users associated with client devices based on communication between a server and the client devices of the public engagement computing platform of FIGS. 1 and 2, according to one or more embodiments.

FIG. 3 shows determining trusted locations (e.g., trusted locations $314_{1-M}$) of users $150_{1-M}$ based on communication between server $102_1$ and client devices $104_{1-M}$ thereof, according to one or more embodiments. In one or more embodiments, server $102_1$ (and/or one or more servers $102_{2-N}$) may periodically communicate with client devices $104_{1-M}$ (e.g., mobile phones) to determine Global Positioning System (GPS) locations thereof. In one or more embodiments, this may be effected through the execution of public engagement computing platform engine $120$/public engagement computing platform engine component(s) $120_{2-N}$ on servers $102_{1-N}$ and public engagement computing platform engine components $190_{1-M}$ on client devices $104_{1-M}$.

In one or more embodiments, the determined GPS location of a client device $104_{1-M}$ may be stored locally within a client device $104_{1-M}$. FIG. 3 shows the determined GPS location (e.g., determined GPS location $302_{1-M}$) locally stored in memory $162_{1-M}$ of client device $104_{1-M}$. In one or more embodiments, server $102_1$/server(s)$102_{2-N}$ may randomly communicate with client device $104_{1-M}$ for determined GPS location $302_{1-M}$. For example, client device $104_{1-M}$ may be communicated with during 10 PM of a night following access of agenda $204$ by client device $104_{1-M}$ and then subsequently at 5 AM on the morning the next day. This may continue for other random times during which the presence of user $150_{1-M}$ at residential address/location provided is expected. For example, client device $104_{1-M}$ may automatically collect GPS coordinates thereof (e.g., GPS coordinate information $304_{1-M}$ shown locally stored in memory $162_{1-M}$; determined GPS location $302_{1-M}$ may be a subset of GPS coordinate information $304_{1-M}$) based on execution of public engagement computing platform engine component $190_{1-M}$ thereon to be polled periodically/randomly for by server $102_1$/server(s) $102_{2-N}$ based on the communication therewith.

The communication may occur until a threshold (e.g., threshold $306$ shown stored in memory $142_1$ of server $102_1$) number of instances of the communication is exceeded. In one or more embodiments, thereupon, server $102_1$ may determine a confidence score $308_{1-M}$ associated with a number of users $150_{1-M}$ based on the result of communication with client devices $104_{1-M}$ thereof pertinent to determined GPS locations $302_{1-M}$. In one or more embodiments, based on confidence score $308_{1-M}$ (e.g., exceeding another threshold thereof), a user $150_{1-M}$ may be verified as a resident of a neighborhood relevant to the resident address provided thereby.

In some embodiments, a predetermined geospatial boundary $310$ may be set through server $102_1$. In one or more embodiments, based on confidence scores $308_{1-M}$, a subset of users $150_{1-M}$ may be verified as a resident of a neighborhood within predetermined geospatial boundary $310$. In one or more embodiments, for the aforementioned purpose, GPS coordinates of client devices $104_{1-M}$ (e.g., mobile phones) may merely be used, without a requirement of corresponding users $150_{1-M}$ to provide residential addresses thereof. In the aforementioned case, user $150_{1-M}$ may be verified as a resident of a neighborhood within predetermined geospatial boundary $310$ in a non-invasive manner.

Obviously, in one or more embodiments, the provision of an actual residential address by user $150_{1-M}$ may factor into the computation of confidence score $308_{1-M}$ thereof; the match between determined GPS location $302_{1-M}$ and residential address may provide for an increased confidence score $308_{1-M}$. In one or more embodiments, once a user $150_{1-M}$ is verified as a resident of a neighborhood within predetermined geospatial boundary $310$, a unique hash key $312_{1-M}$ may be created for user $150_{1-M}$ at server $102_1$. In one or more embodiments, hash key $312_{1-M}$ may not enable access to the exact determined GPS location $302_{1-M}$ of user $150_{1-M}$. In preferred implementations, only the neighborhood and city of residence of user $150_{1-M}$ may be accessible by server $102_1$ based on hash key $312_{1-M}$.

Thus, in one or more embodiments, public engagement computing platform engine $120$ may protect privacy of user $150_{1-M}$ by not dynamically tracking location thereof. The location of user $150_{1-M}$ may be captured only upon location verification based on confidence score $308_{1-M}$. FIG. 3 shows the verified locations of users $150_{1-M}$ as trusted locations $314_{1-M}$ thereof stored in memory $142_1$ of server $102_1$. It should be noted that only a subset of users $150_{1-M}$ may have trusted locations $314_{1-M}$ thereof stored in memory $142_1$ based on the associated confidence scores $308_{1-M}$. Further, it should be noted that client devices $104_{1-M}$ may not be limited to mobile phones.

Figure 4:
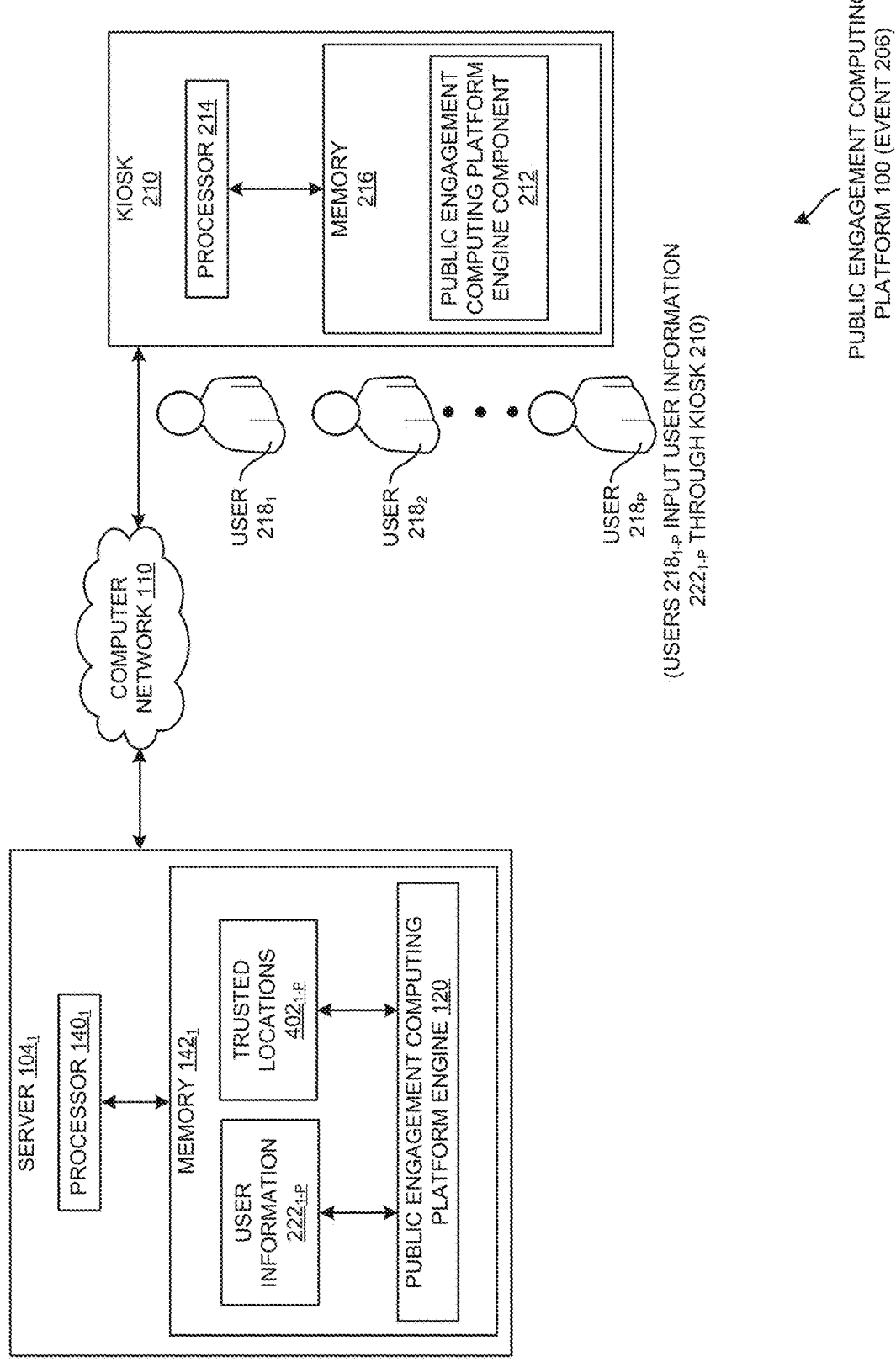
FIG. 4 is a schematic view of determination of trusted locations of users interacting with a kiosk of the public engagement computing platform of FIGS. 1 and 2, according to one or more embodiments.

FIG. 4 shows determination of trusted locations $402_{1-P}$ of users $218_{1-P}$ interacting with kiosk $210$, according to one or more embodiments. Here, trusted locations $402_{1-P}$ may not be determined based on GPS locations of users $218_{1-P}$. As seen above, user information $222_{1-P}$ provided at kiosk $210$ may be verified through kiosk $210$ in conjunction with server $104_1$ through public records/databases available through the Internet. In some implementations, a user $218_{1-P}$ may be required to provide a governmental identification card during information collection through kiosk $210$, based on which the residential address of user $218_{1-P}$ may be verified manually or automatically at kiosk $210$ (and/or in conjunction with server $102_1$).

The determination of trusted locations $402_{1-P}$ of users $218_{1-P}$ may occur during event $206$, according to one or more embodiments, in contrast to determination of trusted locations $314_{1-M}$, which may even be done before event $206$. It should be noted that, again, only another subset of users $218_{1-P}$ may have trusted locations $402_{1-P}$ thereof stored in memory $142_1$ of server $102_1$.

Figure 5:
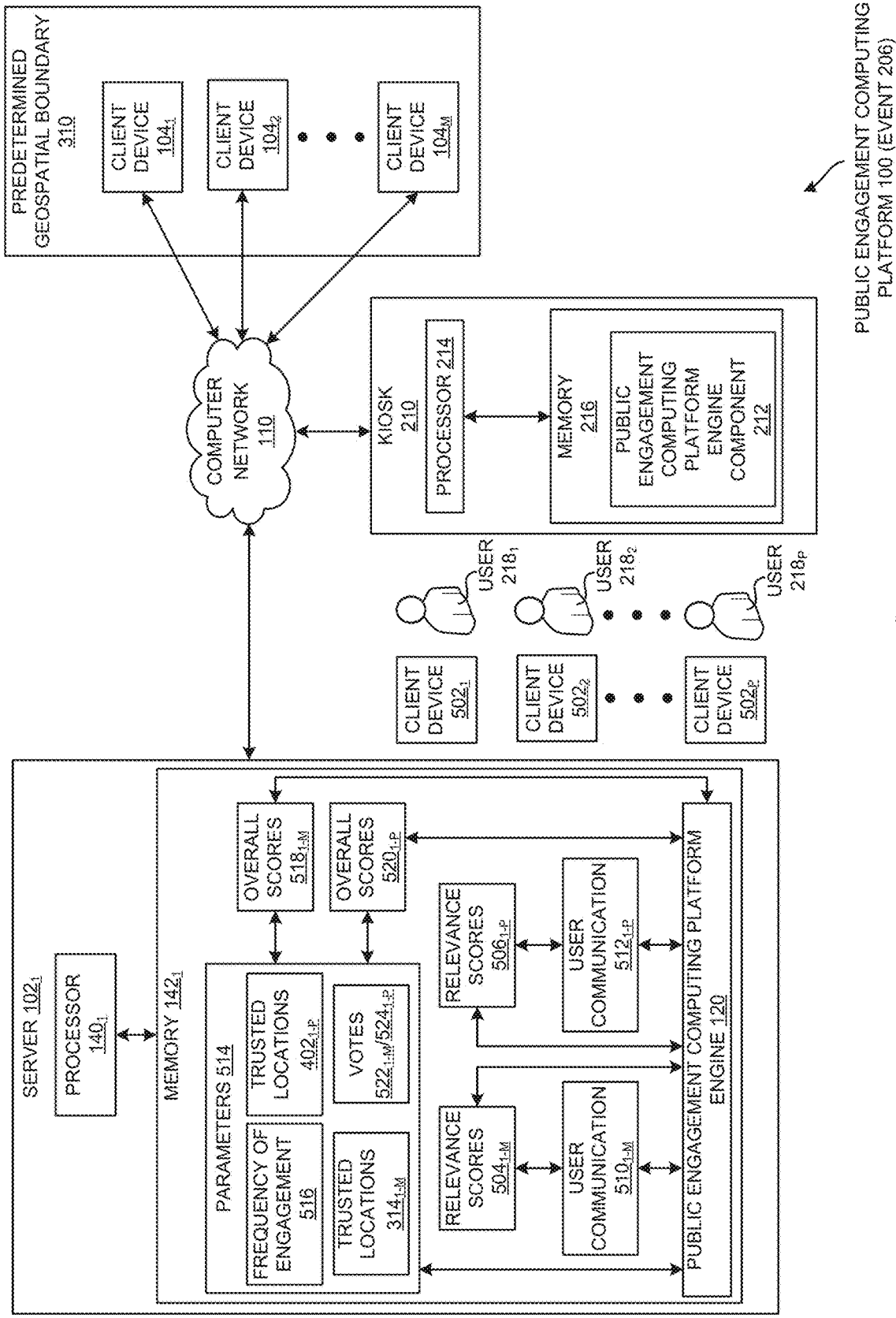
FIG. 5 is a schematic view of analyses of communication relevant to an event/agenda at the server of the public engagement computing platform of FIGS. 1 and 2, according to one or more embodiments.

In one or more embodiments, users $150_{1-M}$ and users $218_{1-P}$ may interact with agenda $204$ during event $206$ and prior to event $206$ in the form of emails, spoken comments and/or other media related to agenda $204$. In one or more embodiments, public engagement computing platform engine $120$ of server $102_1$ may automatically sort, tag, redact and/or organize these interactions therein. FIG. 5 shows analyses of communication relevant to event $206$/agenda $204$ at server $102_1$, according to one or more embodiments. In one or more embodiments, users $150_{1-M}$ at client devices $104_{1-M}$ may interact with agenda $204$ in the form of providing comments (e.g., comments to articles, comments in forum discussions relevant to agenda $204$), suggestions and feedback thereto. Similarly, in one or more embodiments, users $218_{1-P}$ may utilize client devices $502_{1-P}$ thereof to access agenda $204$ via public engagement computing platform engine $120$ of server $102_1$. Alternately, users $218_{1-P}$ may provide communication thereof through kiosk $210$ (e.g., manually to personnel thereat, automatically).

It should be noted that only a subset of users $150_{1-M}$ and another subset of users $218_{1-P}$ whose trusted locations $314_{1-M}$ and trusted locations $402_{1-P}$ are determined through public engagement computing platform engine $120$ may communicate with respect to agenda $204$. Thus, in one or more embodiments, public engagement computing platform engine $120$ may analyze the aforementioned communication from both smaller subsets of users $150_{1-M}$/users $218_{1-P}$ to score each user $150_{1-M}$/user $218_{1-P}$ associated with one or more communication(s). FIG. 5 shows relevance scores $504_{1-M}$ and relevance scores $506_{1-P}$ associated with communication (e.g., user communication $510_{1-M}$ and user communication $512_{1-P}$ respectively) relevant to agenda 204 from the smaller subset of users $150_{1-M}$ and the smaller subset of users $218_{1-P}$ respectively; user communication $510_{1-M}$ and user communication $512_{1-P}$ are actually communication pertinent to smaller subsets; however, 1-M and 1-P have still been used to refer to users $150_{1-M}$ and users $218_{1-P}$ merely for the sake of illustrative convenience.

In one or more embodiments, the relevance scores discussed above may be computed based on specific algorithms executing as part of public engagement computing platform engine 120. In one or more embodiments, the relevance scores may indicate degrees of relevance of user communication $510_{1-M}$ and user communication $512_{1-P}$ with respect to agenda 204. The higher the relevance score, the more the degree of relevance of the aforementioned user communication to agenda 204. For example, calculation of the relevance scores may involve counting frequency of key terms relevant to agenda 204, analyses of communication structure, quality of communication and so on.

In one or more embodiments, public engagement computing platform engine 120 may also incorporate parameters 514 (e.g., stored in memory $142_1$) such as a frequency of engagement 516 of a user $150_{1-M}$/user $218_{1-P}$ with respect to agenda 204/event 206 and trusted locations $314_{1-M}/402_{1-P}$ therethrough (and, through kiosk 210). In one or more embodiments, based on parameters 514 and the relevance scores discussed above, overall scores $518_{1-M}$ and overall scores $520_{1-P}$ may be computed for the smaller subsets of users $150_{1-M}$ and users $218_{1-P}$ respectively. In one or more embodiments, when a trusted location $314_{1-M}/402_{1-P}$ of a user $150_{1-M}/218_{1-P}$ is within predetermined geospatial boundary 310, the corresponding relevance score $504_{1-M}/506_{1-P}$ or overall score $518_{1-M}/520_{1-P}$ may be increased therefor. Further, in one or more embodiments, public engagement computing platform engine 120 may provide a capability to users $150_{1-M}/218_{1-P}$ to vote on comments (e.g., type of user communication $510_{1-M}/512_{1-P}$) through client devices $104_{1-M}$/client devices $502_{1-P}$ thereof. In one or more embodiments, the aforementioned votes may also influence overall scores $518_{1-M}/520_{1-P}$; for example, the more the votes, the more the overall score $518_{1-M}/520_{1-P}$ for a corresponding user $150_{1-M}/218_{1-P}$. FIG. 5 shows parameters 514 as including the aforementioned votes (e.g., votes $522_{1-M}/524_{1-P}$ for corresponding user communication).

FIG. 6 shows publishing of real-time updates of event 206 with respect to agenda 204 on display device 224/public engagement computing platform engine 120, according to one or more embodiments. In one or more embodiments, in accordance with the scoring discussed above, a placement of the analyzed user communication $510_{1-M}$/user communication $512_{1-P}$ may be determined in an order of public viewability. The publicly viewable analyzed user communication $510_{1-M}$/user communication $512_{1-P}$ may obviously be part of the analyzed user communication $510_{1-M}$/user communication $512_{1-P}$ pertinent to event 206 (e.g., live event)/agenda 204. Based on the determination of a place of a specific analyzed user communication $510_{1-M}/512_{1-P}$ in the order (e.g., order 602) of public viewability, the specific analyzed user communication $510_{1-M}/512_{1-P}$ may be rendered on display device 224/public engagement computing platform engine 120 (e.g., through which public viewability is rendered possible through client devices $104_{1-M}$) in order 602.

Obviously, the higher the overall score $518_{1-M}/520_{1-P}$, the higher the place in order 602 of the corresponding specific analyzed user communication $510_{1-M}/512_{1-P}$. Further, in one or more embodiments, users $150_{1-M}$/users $218_{1-P}$ may have expressed intent to speak (e.g., through public engagement computing platform engine 120, speaker cards $220_{1-P}$) during event 206 and/or prior thereto. In one or more embodiments, the overall scoring discussed above may determine an order in which a user $150_{1-M}/218_{1-P}$ is to speak during event 206. In one or more embodiments, for the aforementioned purpose, a level of multimedia access of user $150_{1-M}/218_{1-P}$ with respect to event 206 may be modified therefor. For example, if user $150_{1-M}$ is selected through a client device $104_{1-M}$ thereof having access to public engagement computing platform engine 120 during event 206, public engagement computing platform engine 120 may place user $150_{1-M}$ in an order of speakers. When the turn of user $150_{1-M}$ comes, public engagement computing platform engine 120 may enable user $150_{1-M}$ to leverage a microphone and/or a video camera of client device $104_{1-M}$ thereof to speak during event 206, thereby modifying the level of multimedia access of user $150_{1-M}$.

Alternatively, if user $218_{1-P}$ is selected based on access through kiosk 210, user $218_{1-P}$ may be placed in the same or another order of live speakers; user $218_{1-P}$ may be able to speak when his/her turn comes. In one or more embodiments, server $102_1$ may publish real-time updates through display device 224/public engagement computing platform engine 120 during event 206. As discussed above, server $102_1$ may capture "live" comments from users $218_{1-P}$/users $150_{1-M}$ and publish the aforementioned comments in an order of overall scores thereof. Further, server $102_1$ may target specific interest groups and/or neighborhoods to display a message feed on public engagement computing platform engine 120, according to one embodiment.

It should be noted that server $102_1$ may include a report generator customizable for statistics. In one or more embodiments, server $102_1$ may further implement a sentiment analyzer as part of public engagement computing platform engine 120 to get detailed analytics on sentiments of users $150_{1-M}$/users $218_{1-P}$ with respect to agenda 204 based on inputs received therefrom. In one specific implementation, server $102_1$ may implement one or more artificial intelligence algorithm(s) through public engagement computing platform engine 120 to automatically monitor functionalities thereof.

In one or more embodiments, event 206 discussed above may be a formal gathering to discuss specific upcoming legislations, regulations and/or local issues associated with predetermined geospatial boundary 310. In one or more embodiments, event 206 may be held at a range of venues including schools, hotels, libraries, municipal buildings and churches. Further, geographical location 208 of event 206 may be outside predetermined geospatial boundary 310, although server $102_1$ may determine trusted locations solely within predetermined geospatial boundary 310. In one or more embodiments, event 206 may recorded and streamed through public engagement computing platform engine 120, thereby enabling users $150_{1-M}$ to participate therein through client devices $104_{1-M}$ thereof.

It should be noted that event 206 may not be restricted to governments/city councils; event 206 may also be associated with a municipality, a county, a state, a business organization, a non-profit organization, a school board, a governmental organization and/or a national government. In one or more embodiments, public engagement computing platform 100 may provide a free speech forum for residents (e.g., users $150_{1-M}$/users $218_{1-P}$) within predetermined geospatial boundary 310 to participate in event 206.

It should also be noted that the number of agendas may be more than one. Embodiments discussed herein have been placed within the context of a single agenda 204; however, it is obvious that the concepts discussed herein are applicable to multiple agendas. In one or more embodiments, public engagement computing platform engine 120 may restrict access thereof to users $150_{1-M}$ of client devices $104_{1-M}$ executing public engagement computing platform engine components $190_{1-M}$ thereon, registered users $218_{1-P}$ having client devices $502_{1-P}$ (and obviously executing analogous public engagement computing platform engine components thereon) and kiosk 210.

In one or more embodiments, public engagement computing platform engine 120 may implement a subscription-based model, whereby users $150_{1-M}$ may subscribe to agenda 204 to receive live updates thereto for tracking. In certain implementations, user $150_{1-M}$ may be provided with a capability to endorse other users $150_{1-M}$ within predetermined geospatial boundary 310. Here, user $150_{1-M}$ may communicate with other users $150_{1-M}$ to form a community of residents within predetermined geospatial boundary 310 to coordinate efforts on public engagement computing platform 100. In one or more embodiments, user communication $510_{1-M}$ and user communication $512_{1-P}$ in the form of comments may receive responses from other users $150_{1-M}/218_{1-P}$. In some embodiments, user communication $510_{1-M}/512_{1-P}$ may be converted into an audio format and played during event 206 through public engagement computing platform engine 120.

Figure 7:
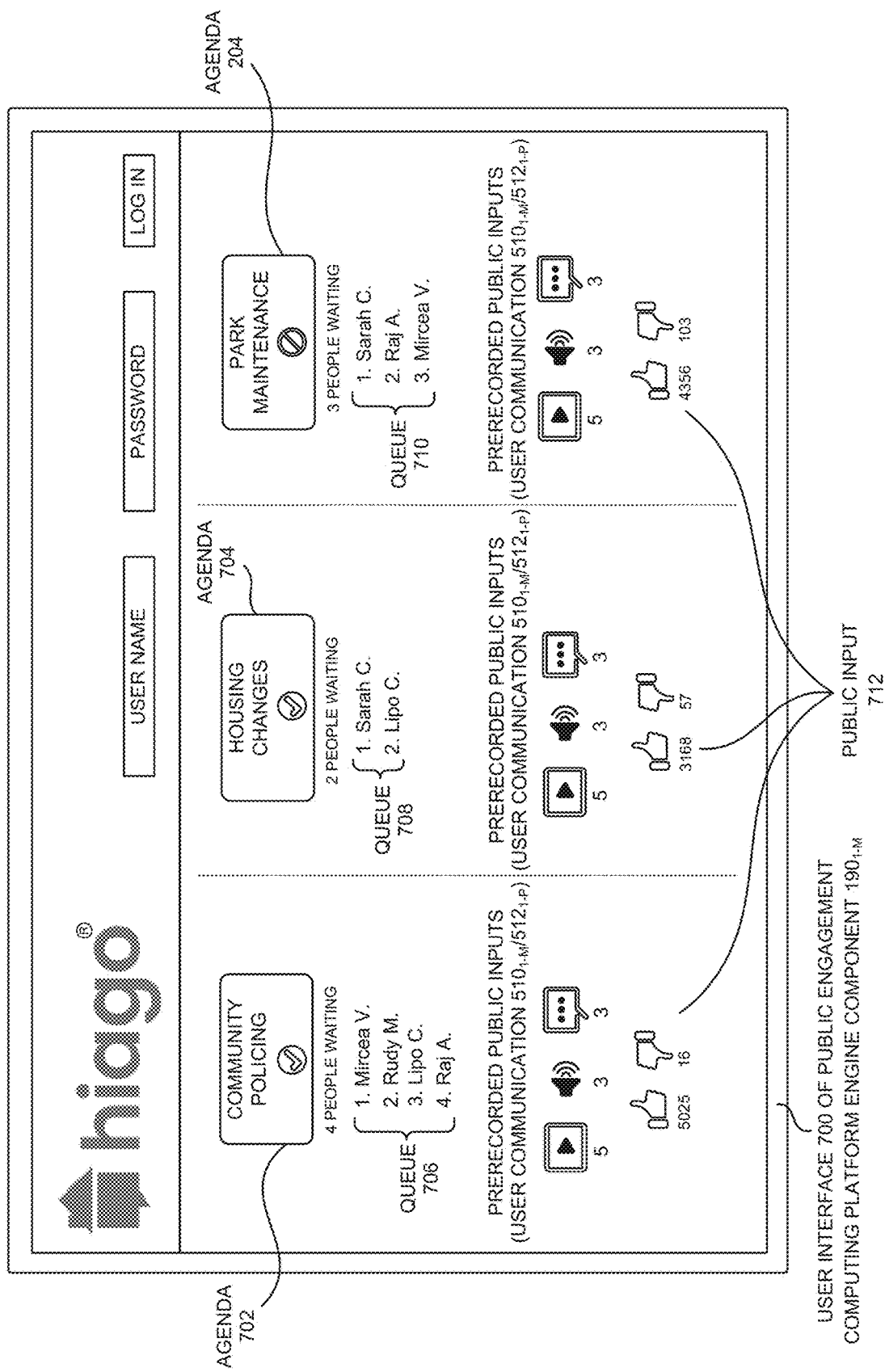
FIG. 7 is a schematic view of a user interface of a public engagement computing platform engine component of a client device accessing the public engagement computing platform engine of FIGS. 1 and 2.

FIG. 7 shows a user interface 700 of public engagement computing platform engine component $190_{1-M}$ of a client device $104_{1-M}$ accessing public engagement computing platform engine 120. Through user interface 700, a number of agendas including agenda 204 (FIG. 7 shows three agendas, viz. agenda 702, agenda 704 and agenda 204 for the sake of illustrative convenience) may be accessed by users $150_{1-M}/218_{1-P}$ and user communication $510_{1-M}/512_{1-P}$ relevant thereto submitted. In one or more embodiments, public engagement computing platform engine 120 may process user communication $510_{1-M}/512_{1-P}$ prior to scoring or publication thereof.

FIG. 7 also shows a queue (e.g., queue 706, queue 708, queue 710) associated with each agenda. Within each queue, a list of users $150_{1-M}$/users $218_{1-P}$ may be in wait to speak live during event 206. In one example implementation, prerecorded user communication $510_{1-M}/512_{1-P}$ may be accessible for agenda 204. Similarly, prerecorded user communication may be accessible for all other agendas (e.g., agenda 702, agenda 704). FIG. 7 illustrates the public input 712 tab enabling users $150_{1-M}/218_{1-P}$ to view and provide feedback for a specific agenda (e.g., agenda 204) that then becomes part of user communication $510_{1-M}/512_{1-P}$.

Figure 8:
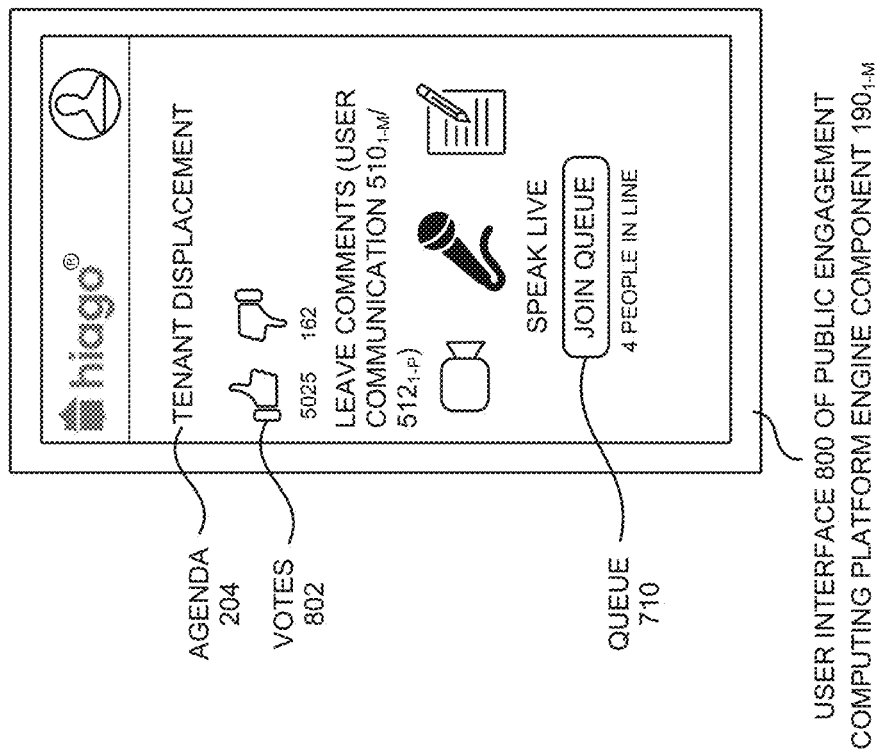
FIG. 8 is a schematic view of another user interface of a public engagement computing platform engine component of the client device accessing the public engagement computing platform engine of FIGS. 1, 2 and 7.

FIG. 8 shows another user interface 800 of public engagement computing platform engine component $190_{1-M}$ executing on client device $104_{1-M}$ accessing public engagement computing platform engine component 120. User interface 800 shows options to vote 802 on agenda 204 (e.g., by expressing a like through an upvote or a dislike through a downvote therefor). FIG. 8 also shows user interface 800 providing user $150_{1-M}$ with a capability to join queue 710 with regard to speaking about agenda 204.

Figure 9:
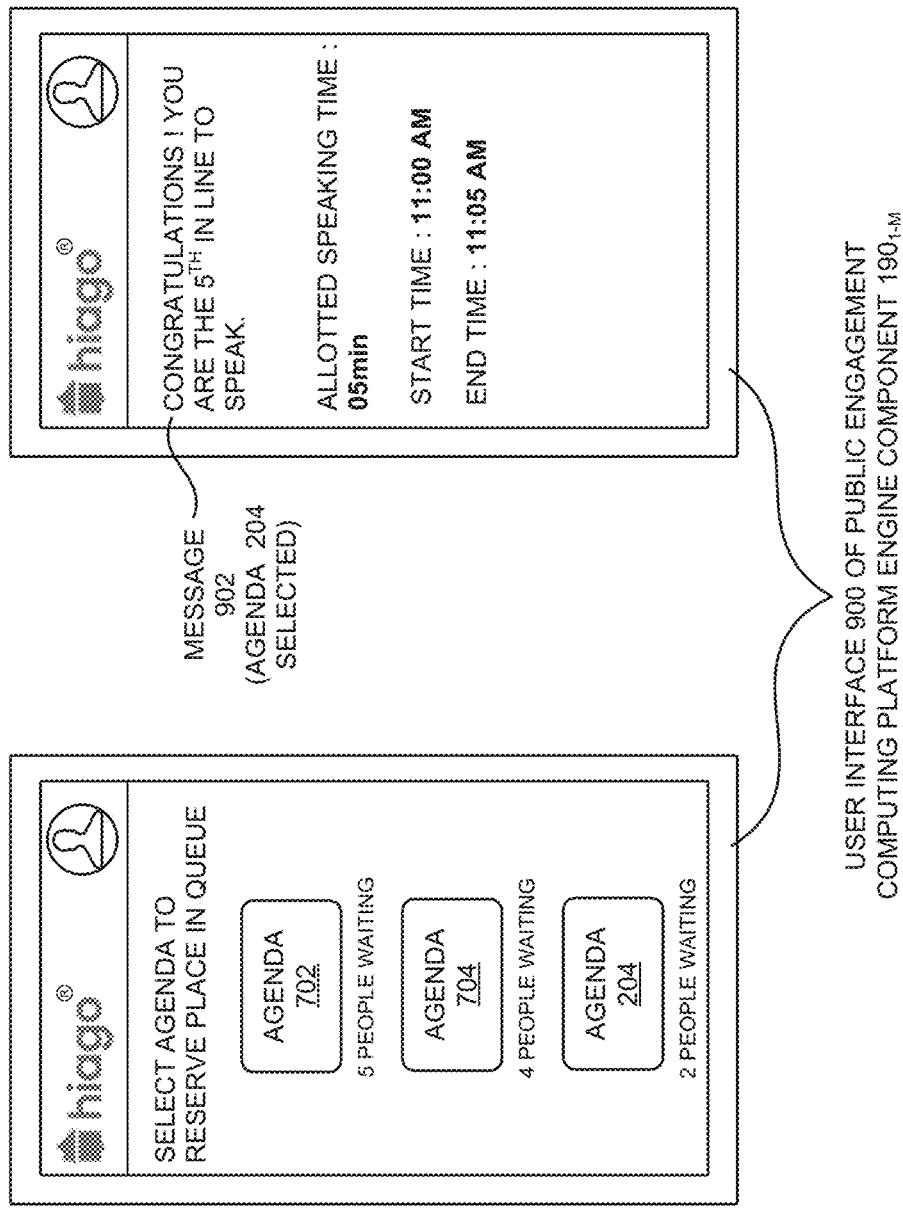
FIG. 9 is a schematic view of yet another user interface of a public engagement computing platform engine component of the client device accessing the public engagement computing platform engine of FIGS. 1, 2, 7 and 8.

In one or more embodiments, votes 802 counted by public engagement computing platform engine 120 may be counted toward generating overall scores $518_{1-M}/520_{1-P}$. FIG. 9 shows yet another user interface 900 of public engagement computing platform engine component $190_{1-M}$ executing on client device $104_{1-M}$ accessing public engagement computing platform engine 120. Here, a user $150_{1-M}/218_{1-P}$ may be able to choose an agenda out of available options, viz. agenda 702, agenda 704 and agenda 204. Upon selection of an agenda (e.g., agenda 204), user $150_{1-M}/218_{1-P}$ may be able to view a message 902 pertaining to a place in queue 710, an allotted time to speak and an expected duration of the speech. In one or more other embodiments, user $150_{1-M}/218_{1-P}$ may receive message 902 via a text messaging application of client device $104_{1-M}$/client device $502_{1-P}$ thereof or by e-mail.

An example embodiment will now be described. John Doe may be newly appointed as a city councilor of Menlo Park city. John may have to attend the public meetings and respond to the queries of the residents and investigate their concerns. John may have faced an issue reaching beyond the usual groups of active residents present in the public meetings. John may want more residents to be involved to provide opportunities for exploring alternative strategies to resolve the issues for the betterment of the city. However, the fixed availability of seats in the public meeting hall and timing of the public meetings may have restricted the number of the residents in the public meetings.

John Doe may have been advised by his personal assistant to install the disclosed system described in various embodiments of FIGS. 1-9 to enhance public participation in the public meetings. Server $102_1$/one or more other servers $102_{2-N}$ implementing public engagement computing platform 100 described in various embodiments of FIGS. 1-9 may help John to interact with the residents (e.g., users $150_{1-M}/218_{1-P}$) of Menlo Park city through client devices $104_{1-M}/502_{1-P}$ thereof and obtain feedback, comments and suggestions therefrom to resolve pertinent issues.

Another example embodiment will now be described. Fred Jackson may be a writer by profession residing in Menlo Park city. Sometimes, Fred may have to work from home. Fred's job may require high concentration and dedication. While working from home, Fred may lose focus because of the noise-causing gas-powered leaf blower used in the neighborhood. Fred may want to suggest the banning of gas-powered leaf blowers within the neighborhood to the city council.

Fred may not be able to attend the live public meetings because of his busy schedule. Fred may have tried to contact the city council via email. However, Fred may not have been satisfied with the received responses. Fred may have felt discouraged with respect to communicating thoughts to the council.

Fred Jackson may utilize public engagement computing platform 100 above to propose the ban as agenda 204 to the city council. The various embodiments discussed with respect to FIGS. 1-9 may help Fred realize his goal.

Figure 10:
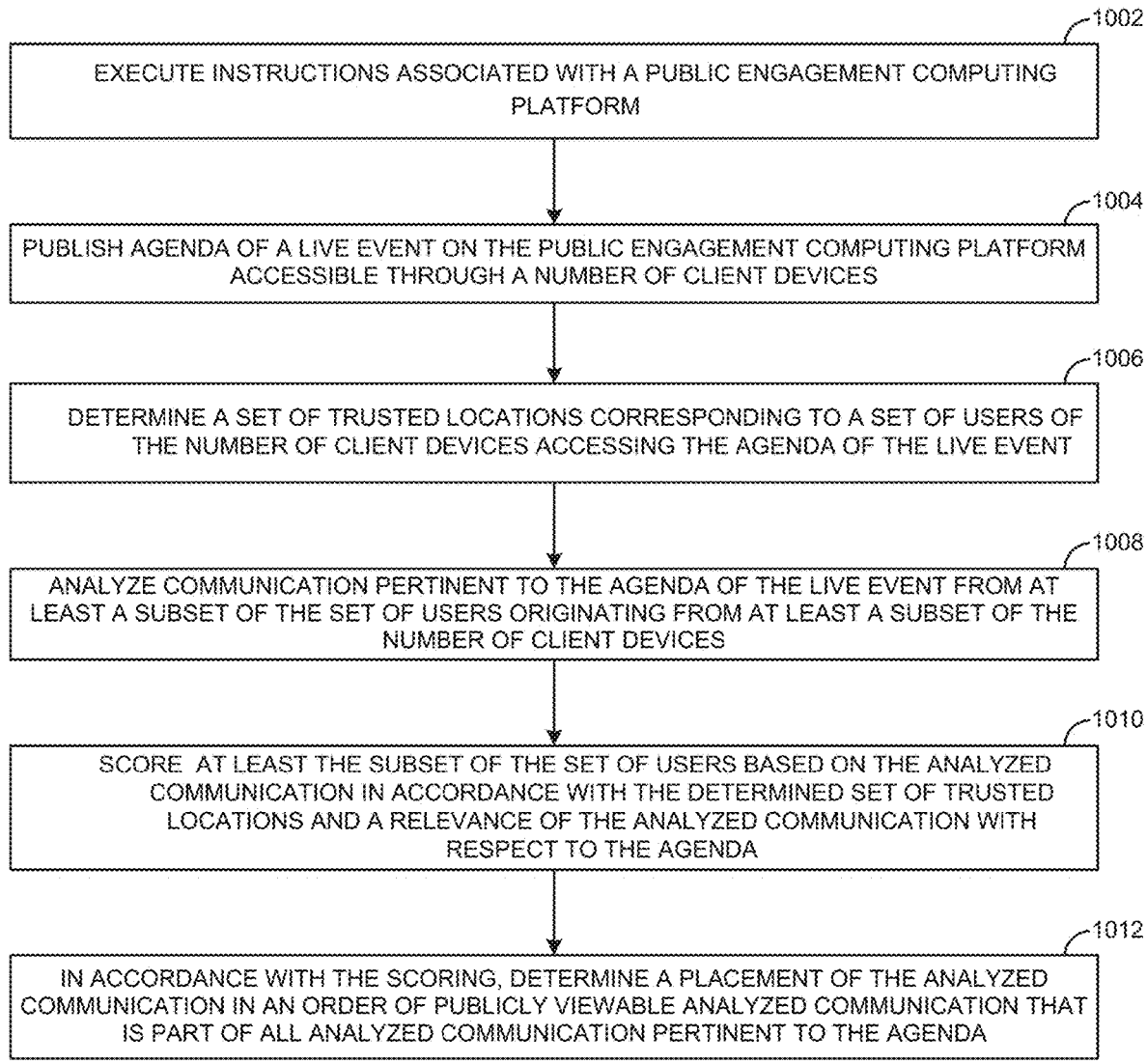
FIG. 10 is a process flow diagram detailing the operations involved in implementing a public engagement computing platform, according to one or more embodiments.

FIG. 10 shows a process flow diagram detailing the operations involved in implementing a (e.g., public engagement computing platform 100) public engagement computing platform, according to one or more embodiments. In one or more embodiments, operation 1002 may involve executing, through a server (e.g., server $102_1$) including a processor (e.g., processor $140_1$) communicatively coupled to a memory (e.g., memory $142_1$), instructions associated with the public engagement computing platform. In one or more embodiments, in accordance with the execution of the instructions associated with the public engagement computing platform, operation 1004 may involve publishing an agenda (e.g., agenda 204) of a live event (e.g., event 206) on the public engagement computing platform accessible through a number of client devices (e.g., client devices $104_{1-M}$) communicatively coupled to the server through a computer network (e.g., computer network 110).

In one or more embodiments, operation 1006 may involve determining a set of trusted locations (e.g., trusted locations $314_{1-M}$) corresponding to a set of users of the number of client devices accessing the agenda of the live event based on communicating, for a threshold number of instances, with each of the number of client devices for a GPS location (e.g., determined GPS location $302_{1-M}$) thereof during times of expected presence of a corresponding user of the set of users at a place of residence thereof within a predetermined geospatial boundary (e.g., predetermined geospatial boundary 310), and determining, based on the communication with the each of the number of client devices for the GPS location thereof, a confidence score (e.g., confidence score $308_{1-M}$) for the corresponding user of the set of users indicating a likelihood of the place of residence of the corresponding user being a trusted location within the predetermined geospatial boundary.

In one or more embodiments, operation 1008 may involve analyzing communication (e.g., user communication $510_{1-M}$) pertinent to the agenda of the live event from at least a subset of the set of users originating from at least a subset of the number of client devices. In one or more embodiments, operation 1010 may involve scoring (e.g., overall score $518_{1-M}$) at least the subset of the set of users based on the analyzed communication in accordance with the determined set of trusted locations and a relevance (e.g., relevance score $504_{1-M}$) of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary.

In one or more embodiments, operation 1012 may then involve, in accordance with the scoring, determining a placement of the analyzed communication in an order (e.g., order 602) of publicly viewable analyzed communication that is part of all analyzed communication pertinent to the agenda.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium such as a Compact Disc (CD), a Digital Video Disc (DVD), a hard drive). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., servers $102_{1-N}$, client devices $104_{1-M}$, kiosk 210, client devices $502_{1-P}$). Accordingly, the specification and drawings are to be regarded in an illustrative rather than a restrictive sense.

The invention claimed is:

1. A method comprising:
executing, through a server comprising a processor communicatively coupled to a memory, instructions associated with a public engagement computing platform; and in accordance with the execution of the instructions associated with the public engagement computing platform,
publishing an agenda of a live event on the public engagement computing platform accessible through a plurality of client devices communicatively coupled to the server through a computer network,
determining a set of trusted locations corresponding to a set of users of the plurality of client devices accessing the agenda of the live event based on:
communicating, for a threshold number of instances, with each of the plurality of client devices for a Global Positioning System (GPS) location thereof during times of expected presence of a corresponding user of the set of users at a place of residence thereof within a predetermined geospatial boundary, and
determining, based on the communication with the each of the plurality of client devices for the GPS location thereof, a confidence score for the corresponding user of the set of users indicating a likelihood of the place of residence of the corresponding user being a trusted location within the predetermined geospatial boundary,
analyzing communication pertinent to the agenda of the live event from at least a subset of the set of users originating from at least a subset of the plurality of client devices,
scoring at least the subset of the set of users based on the analyzed communication in accordance with the determined set of trusted locations and a relevance of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary, and
in accordance with the scoring,
determining a placement of the analyzed communication in an order of publicly viewable analyzed communication that is part of all analyzed communication pertinent to the agenda.

2. The method of claim 1, further comprising:
based on the execution of the instructions associated with the public engagement computing platform, rendering the agenda on a display device communicatively coupled to the server such that the agenda is publicly viewable at a geographical location of the live event;
capturing interactions of another set of users with respect to the agenda through a kiosk communicatively coupled to the server and within the same geographical location as the display device;
determining another set of trusted locations corresponding to the another set of users interacting with respect to the agenda by way of the kiosk;
analyzing another communication pertinent to the agenda of the live event from at least another subset of the another set of users originating through the kiosk;
scoring at least the another subset of the another set of users based on the analyzed another communication in accordance with the determined another set of trusted locations thereof and another relevance of the analyzed another communication with respect to the agenda, with one user of at least the another subset of the another set of users whose determined trusted location is within the predetermined geospatial boundary receiving a higher score therefor in contrast to another user of at least the another subset of the another set of users whose determined trusted location is outside the predetermined geospatial boundary; and in accordance with the scoring,
determining another placement of the analyzed another communication in the order of publicly viewable analyzed communication that is part of all analyzed communication pertinent to the agenda.

3. The method of claim 1, comprising determining the set of trusted locations corresponding to the set of users of the plurality of client devices accessing the agenda of the live event based on creating a unique hash key for the corresponding user of the set of users that does not enable access of the GPS location thereof to the server.

4. The method of claim 1, further comprising additionally incorporating at least one of: votes on the analyzed communication from users of the plurality of client devices and a frequency of communication into the scoring of at least the subset of the set of users based on the analyzed communication.

5. The method of claim 1, further comprising modifying a level of multimedia access of at least one of: the one user and the another user to the live event by way of the public engagement computing platform based on the scoring of the analyzed communication associated therewith.

6. The method of claim 2, comprising collecting information from the another set of users through the kiosk to determine the another set of trusted locations.

7. The method of claim 1, comprising distributedly executing the instructions associated with the public engagement computing platform through a plurality of networked individual servers constituting the server.

8. A system comprising:
a plurality of client devices; and
a server executing instructions associated with a public engagement computing platform, the server communicatively coupled to the plurality of client devices through a computer network,
wherein, in accordance with the execution of the instructions associated with the public engagement computing platform, the server:
publishes an agenda of a live event on the public engagement computing platform accessible through the plurality of client devices,
determines a set of trusted locations corresponding to a set of users of the plurality of client devices accessing the agenda of the live event based on:
communicating, for a threshold number of instances, with each of the plurality of client devices for a GPS location thereof during times of expected presence of a corresponding user of the set of users at a place of residence thereof within a predetermined geospatial boundary, and
determining, based on the communication with the each of the plurality of client devices for the GPS location thereof, a confidence score for the corresponding user of the set of users indicating a likelihood of the place of residence of the corresponding user being a trusted location within the predetermined geospatial boundary,
analyzes communication pertinent to the agenda of the live event from at least a subset of the set of users originating from at least a subset of the plurality of client devices,
scores at least the subset of the set of users based on the analyzed communication in accordance with the determined set of trusted locations and a relevance of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary, and
in accordance with the scoring,
determines a placement of the analyzed communication in an order of publicly viewable analyzed communication that is part of all analyzed communication pertinent to the agenda.

9. The system of claim 8, further comprising:
a display device communicatively coupled to the server to render the agenda thereon such that the agenda is publicly viewable at a geographical location of the live event; and
a kiosk within the same geographical location as the display device to capture interactions of another set of users with respect to the agenda,
wherein, in accordance with the further execution of instructions associated with the public engagement computing platform engine, the server:
determines another set of trusted locations corresponding to the another set of users interacting with respect to the agenda by way of the kiosk,
analyzes another communication pertinent to the agenda of the live event from at least another subset of the another set of users originating through the kiosk,
scores at least the another subset of the another set of users based on the analyzed another communication in accordance with the determined another set of trusted locations thereof and another relevance of the analyzed another communication with respect to the agenda, with one user of at least the another subset of the another set of users whose determined trusted location is within the predetermined geospatial boundary receiving a higher score therefor in contrast to another user of at least the another subset of the another set of users whose determined trusted location is outside the predetermined geospatial boundary, and
in accordance with the scoring,
determines another placement of the analyzed another communication in the order of publicly viewable analyzed communication that is part of all analyzed communication pertinent to the agenda.

10. The system of claim 8, wherein the server determines the set of trusted locations corresponding to the set of users of the plurality of client devices accessing the agenda of the live event based on creating a unique hash key for the corresponding user of the set of users that does not enable access of the GPS location thereof to the server.

11. The system of claim 8, wherein the server additionally incorporates at least one of: votes on the analyzed communication from users of the plurality of client devices and a frequency of communication into the scoring of at least the subset of the set of users based on the analyzed communication.

12. The system of claim 8, wherein the server further modifies a level of multimedia access of at least one of: the one user and the another user to the live event by way of the public engagement computing platform based on the scoring of the analyzed communication associated therewith.

13. The system of claim 9, wherein the kiosk collects information from the another set of users to enable the server to determine the another set of trusted locations.

14. The system of claim 8, wherein the instructions associated with the public engagement computing platform are distributedly executed through a plurality of networked individual servers constituting the server.

15. A server comprising:
    a memory; and
    a processor communicatively coupled to the memory, the processor executing instructions associated with a public engagement computing platform to,
        publish an agenda of a live event on the public engagement computing platform accessible through a plurality of client devices communicatively coupled to the server through a computer network,
        determine a set of trusted locations corresponding to a set of users of the plurality of client devices accessing the agenda of the live event based on:
            communicating, for a threshold number of instances, with each of the plurality of client devices for a GPS location thereof during times of expected presence of a corresponding user of the set of users at a place of residence thereof within a predetermined geospatial boundary, and
            determining, based on the communication with the each of the plurality of client devices for the GPS location thereof, a confidence score for the corresponding user of the set of users indicating a likelihood of the place of residence of the corresponding user being a trusted location within the predetermined geospatial boundary,
        analyze communication pertinent to the agenda of the live event from at least a subset of the set of users originating from at least a subset of the plurality of client devices,
        score at least the subset of the set of users based on the analyzed communication in accordance with the determined set of trusted locations and a relevance of the analyzed communication with respect to the agenda, with one user of at least the subset of the set of users whose determined trusted location is within the predetermined geospatial boundary receiving a higher score therefor in contrast to another user of at least the subset of the set of users whose determined trusted location is outside the predetermined geospatial boundary, and
        in accordance with the scoring,
            determine a placement of the analyzed communication in an order of publicly viewable analyzed communication that is part of all analyzed communication pertinent to the agenda.

16. The server of claim 15, wherein the processor further executes instructions associated with the public engagement computing platform to:
    render the agenda through a display device communicatively coupled to the server such that the agenda is publicly viewable at a geographical location of the live event, and
    enable capturing interactions of another set of users with respect to the agenda through a kiosk within the same geographical location as the display device,
    determine another set of trusted locations corresponding to the another set of users interacting with respect to the agenda by way of the kiosk,
    analyze another communication pertinent to the agenda of the live event from at least another subset of the another set of users originating through the kiosk,
    score at least the another subset of the another set of users based on the analyzed another communication in accordance with the determined another set of trusted locations thereof and another relevance of the analyzed another communication with respect to the agenda, with one user of at least the another subset of the another set of users whose determined trusted location is within the predetermined geospatial boundary receiving a higher score therefor in contrast to another user of at least the another subset of the another set of users whose determined trusted location is outside the predetermined geospatial boundary, and
    in accordance with the scoring,
        determine another placement of the analyzed another communication in the order of publicly viewable analyzed communication that is part of all analyzed communication pertinent to the agenda.

17. The server of claim 15, wherein the processor executes instructions associated with the public engagement computing platform to determine the set of trusted locations corresponding to the set of users of the plurality of client devices accessing the agenda of the live event based on creating a unique hash key for the corresponding user of the set of users that does not enable access of the GPS location thereof to the server.

18. The server of claim 15, wherein the processor further executes instructions associated with the public engagement computing platform to additionally incorporate at least one of: votes on the analyzed communication from users of the plurality of client devices and a frequency of communication into the scoring of at least the subset of the set of users based on the analyzed communication.

19. The server of claim 15, wherein the processor further executes instructions associated with the public engagement computing platform to modify a level of multimedia access of at least one of: the one user and the another user to the live event by way of the public engagement computing platform based on the scoring of the analyzed communication associated therewith.

20. The server of claim 16, wherein the processor executes instructions associated with the public engagement computing platform to enable the kiosk to collect information from the another set of users to determine the another set of trusted locations through the server.

* * * * *